US012631521B2

(12) United States Patent
    Kohno et al.

(10) Patent No.: US 12,631,521 B2
(45) Date of Patent: May 19, 2026

(54) OPTICAL FIBER SENSOR AND CHANGE DETECTION METHOD

(71) Applicant: NEC Corporation, Tokyo (JP)

(72) Inventors: Wataru Kohno, Tokyo (JP); Tomoyuki Hino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 223 days.

(21) Appl. No.: 18/572,288

(22) PCT Filed: Jun. 25, 2021

(86) PCT No.: PCT/JP2021/024168
    § 371 (c)(1),
    (2) Date: Dec. 20, 2023

(87) PCT Pub. No.: WO2022/269911
    PCT Pub. Date: Dec. 29, 2022

(65) Prior Publication Data
    US 2024/0288335 A1    Aug. 29, 2024

(51) Int. Cl.
    *G01M 11/00*        (2006.01)
    *G01D 5/353*        (2006.01)
    *G01H 9/00*         (2006.01)

(52) U.S. Cl.
    CPC ..... *G01M 11/3145* (2013.01); *G01D 5/35358* (2013.01); *G01D 5/3537* (2013.01); *G01H 9/004* (2013.01)

(58) Field of Classification Search
    CPC .......... G01H 9/00; G01H 9/004; G01H 9/006;

G01D 5/35383; G01D 5/35361; G01D 5/35358; G01D 5/3537; G01D 5/35374; G01D 5/35354; G01D 5/268; G01D 5/353; G01D 5/35303; G01D 5/35306; G01D 5/35316; G01D 5/35348; G01D 5/3536; G01D 5/35387; G01D 5/3539;
    (Continued)

(56) References Cited

U.S. PATENT DOCUMENTS 4,297,887 A * 11/1981 Bucaro .................. G01H 9/004
                                            367/140
5,698,848 A * 12/1997 Belk .................. G01D 5/35383
                                            250/227.14
(Continued)

FOREIGN PATENT DOCUMENTS

CA        2240664 A1 * 7/1997 .......... G01M 5/0091
CN      104990620 A    10/2015
(Continued)

OTHER PUBLICATIONS

International Search Report for PCT Application No. PCT/JP2021/024168, mailed on Sep. 7, 2021.
(Continued)

*Primary Examiner* — Gordon J Stock, Jr.

(57)                ABSTRACT

The optical fiber sensor includes a setting unit which sets a section to be evaluated set in the optical fiber to one of a first section and a plurality of second sections, each of which is shorter than the first section, an extraction unit which extracts a state change of light from the optical fiber, and a detection unit which detects a change in the surrounding environment based on time-series data of the state change of light in the section to be evaluated.

9 Claims, 9 Drawing Sheets

(58) Field of Classification Search

CPC ..... G01D 5/35393; G01L 1/242; G01L 1/245; G01L 1/243; G01L 1/246; G01L 1/02; G01L 1/025; G01K 11/32; G01K 11/3206; G01K 11/3213; G01K 11/322; G01K 11/324; G01B 11/18; G01B 11/16; G01B 11/24; G01M 11/085; G01M 11/086; G01M 11/3109; G01M 11/3145; G01M 11/0207; G01M 11/025; G01M 11/31; G01M 11/3118; G01M 11/3136; G01M 11/3127; G01M 11/3172; G01M 11/3181; G01M 5/0025; G01M 5/0041; G01M 5/0066; G01M 5/0091

See application file for complete search history.

(56) References Cited

U.S. PATENT DOCUMENTS

| | | | | |
|---|---|---|---|---|
| 6,351,987 | B1 * | 3/2002 | Winston | G01N 33/2823 |
| | | | | 73/53.01 |
| 7,262,834 | B2 * | 8/2007 | Kageyama | G01H 9/004 |
| | | | | 356/28 |
| 7,366,055 | B2 * | 4/2008 | Ronnekleiv | G01D 5/35383 |
| | | | | 367/64 |
| 7,488,929 | B2 * | 2/2009 | Townley-Smith | G08B 13/186 |
| | | | | 250/227.14 |
| 7,995,874 | B2 * | 8/2011 | Sasaoka | G01K 11/32 |
| | | | | 356/73.1 |
| 8,121,442 | B2 * | 2/2012 | Huffman | G01H 9/004 |
| | | | | 385/12 |
| 8,131,121 | B2 * | 3/2012 | Huffman | G01M 5/0041 |
| | | | | 356/73.1 |
| 8,436,732 | B2 * | 5/2013 | Lamont | G08B 13/124 |
| | | | | 340/541 |
| 10,845,268 | B1 * | 11/2020 | O'Sullivan | G01M 11/3109 |
| 11,041,741 | B2 * | 6/2021 | Iwamura | G01D 5/3537 |
| 11,698,289 | B2 * | 7/2023 | Hu | G01H 9/004 |
| | | | | 73/653 |
| 11,927,463 | B2 * | 3/2024 | Yano | G01F 1/661 |
| 2003/0072514 | A1 * | 4/2003 | Ames | G01D 5/35383 |
| | | | | 385/12 |
| 2011/0320147 | A1 * | 12/2011 | Brady | G01D 5/35361 |
| | | | | 385/12 |
| 2016/0170082 | A1 * | 6/2016 | Ikegami | E21B 47/135 |
| | | | | 367/35 |
| 2022/0225033 | A1 * | 7/2022 | Kojima | G01H 9/00 |
| 2023/0160742 | A1 * | 5/2023 | Ellwood | G01D 5/35364 |
| | | | | 356/73.1 |
| 2025/0189086 | A1 * | 6/2025 | Fakiri | G01M 11/083 |

FOREIGN PATENT DOCUMENTS

| | | | | | |
|---|---|---|---|---|---|
| CN | 108645498 | A | | 10/2018 | |
| JP | H04-307328 | A | | 10/1992 | |
| JP | 2000046528 | A | * | 2/2000 | |
| JP | 2000-182158 | A | | 6/2000 | |
| JP | 2012-68081 | A | | 4/2012 | |
| JP | 2017-72557 | A | | 4/2017 | |
| JP | 2021-67681 | A | | 4/2021 | |
| WO | 2008/050557 | A1 | | 5/2008 | |
| WO | WO-2017086952 | A1 | * | 5/2017 | E21B 47/00 |
| WO | 2017/216999 | A1 | | 12/2017 | |
| WO | WO-2022114543 | A1 | * | 6/2022 | G01N 29/04 |

OTHER PUBLICATIONS

Written opinion for PCT Application No. PCT/JP2021/024168, mailed on Sep. 7, 2021.

R. O. Schmidt, "Multiple emitter location and signal parameter estimation", IEEE Transactions on Antennas and Propagation, vol. AP-34, No. 3, No. pp. 276-280, Mar. 1986.

* cited by examiner

FIG. 4

ACOUSTIC DATA
(PHASE DIFFERENCE SIGNAL)

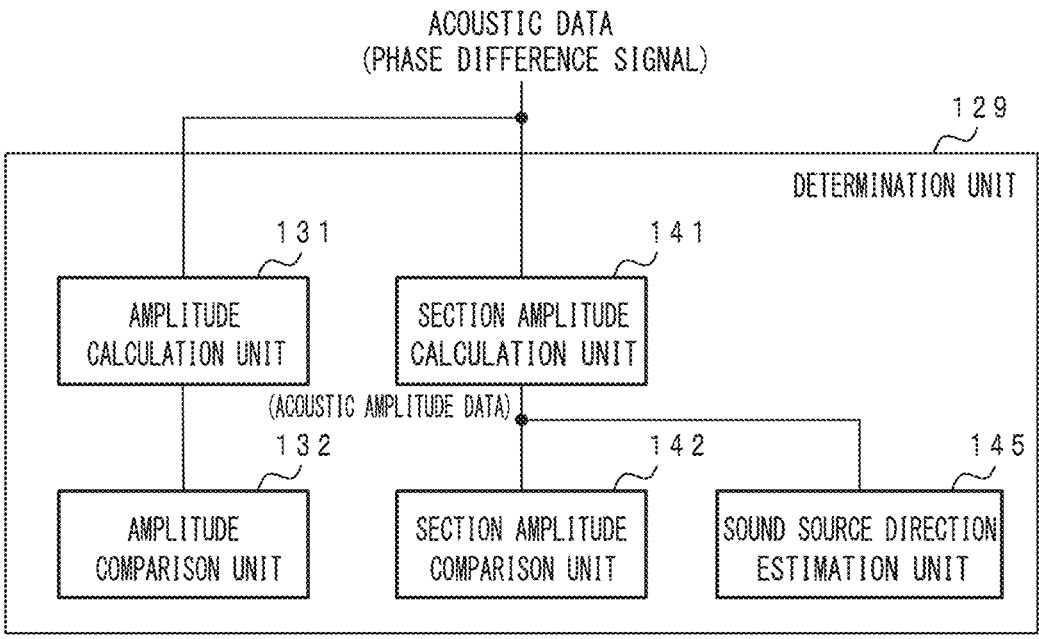

129

DETERMINATION UNIT

131

AMPLITUDE
CALCULATION UNIT

141

SECTION AMPLITUDE
CALCULATION UNIT (ACOUSTIC AMPLITUDE DATA)

132

AMPLITUDE
COMPARISON UNIT

142

SECTION AMPLITUDE
COMPARISON UNIT

145

SOUND SOURCE DIRECTION
ESTIMATION UNIT

FIG. 5

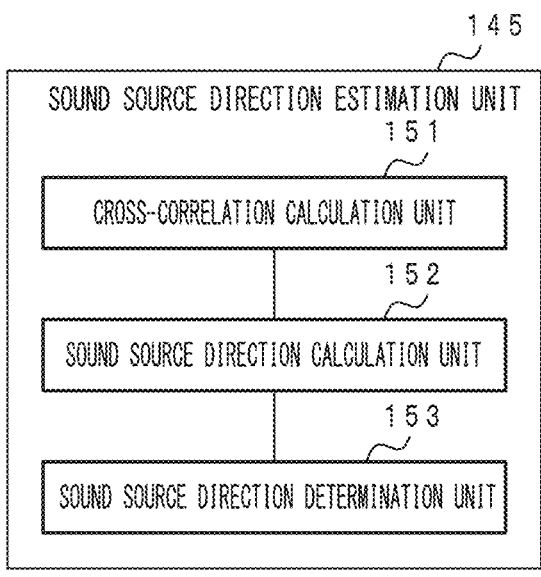

145

SOUND SOURCE DIRECTION ESTIMATION UNIT

151

CROSS-CORRELATION CALCULATION UNIT

152

SOUND SOURCE DIRECTION CALCULATION UNIT

153

SOUND SOURCE DIRECTION DETERMINATION UNIT

FIG. 7

BLACK :
VIBRATION WAVEFORM
GRAY: DENOISED
WAVEFORM

SECOND

BLACK :
VIBRATION WAVEFORM
GRAY:
AMPLITUDE AVERAGE
THRESHOLD

SECOND

FIG. 8

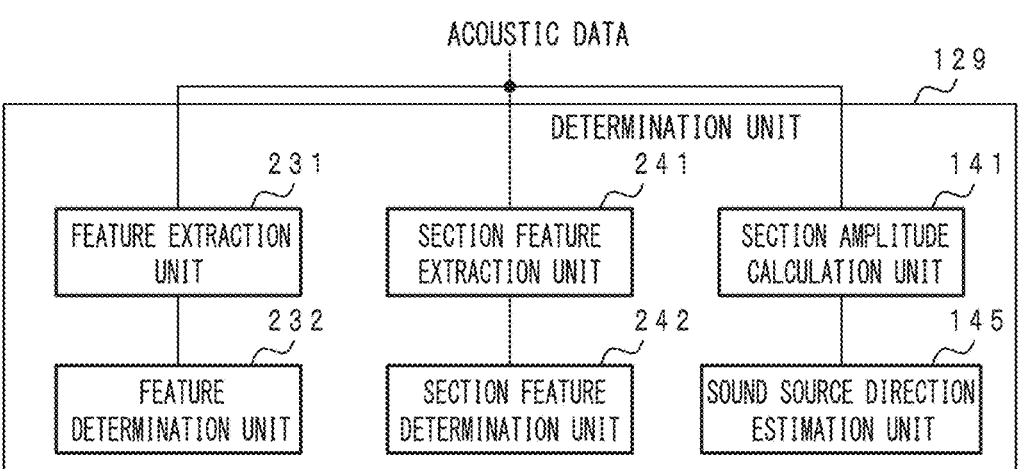

ACOUSTIC DATA

129

DETERMINATION UNIT

231
FEATURE EXTRACTION UNIT

241
SECTION FEATURE EXTRACTION UNIT

141
SECTION AMPLITUDE CALCULATION UNIT

232
FEATURE DETERMINATION UNIT

242
SECTION FEATURE DETERMINATION UNIT

145
SOUND SOURCE DIRECTION ESTIMATION UNIT

FIG. 9

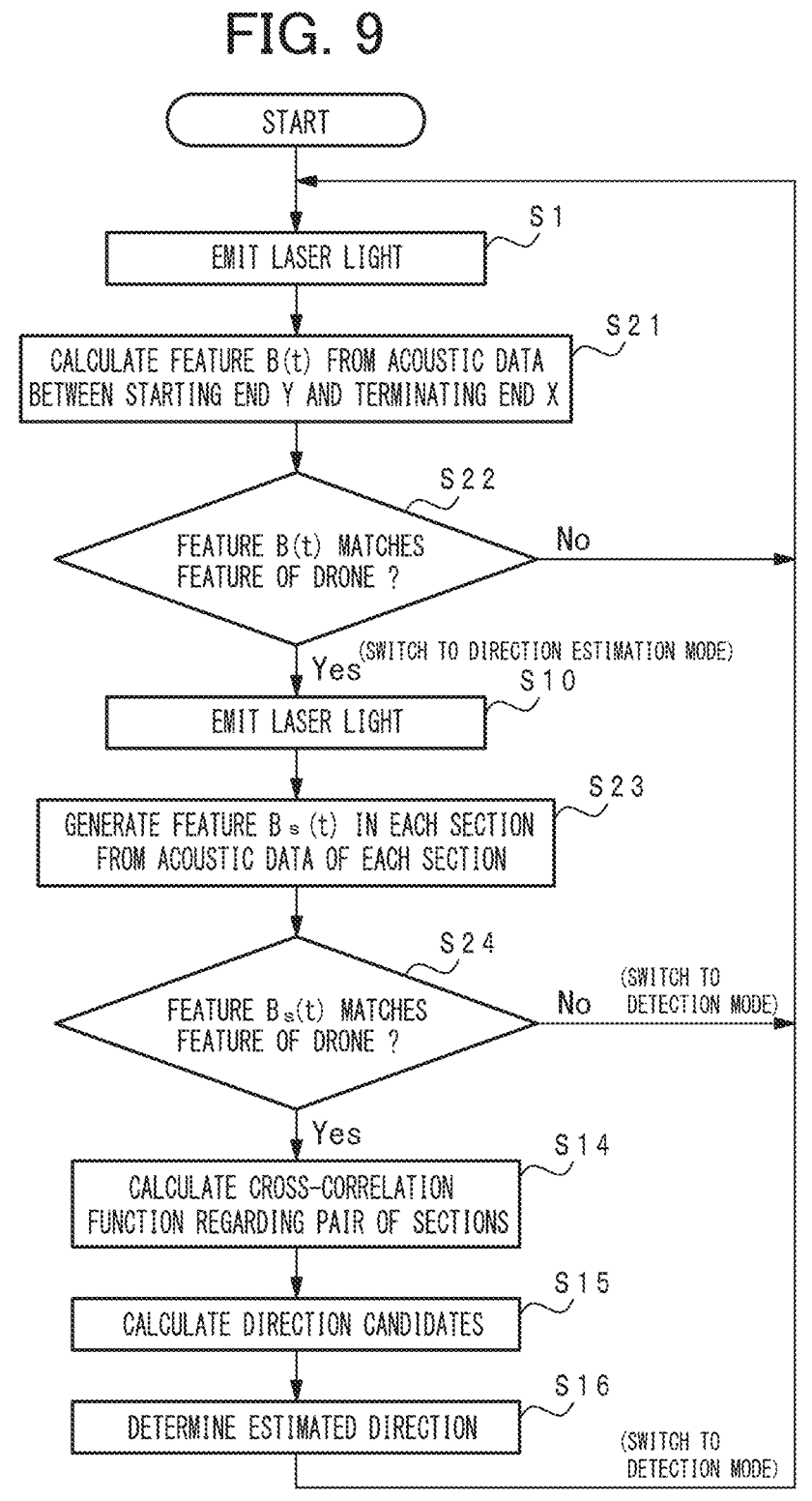

START

↓

EMIT LASER LIGHT ⟿ S1

↓

CALCULATE FEATURE B(t) FROM ACOUSTIC DATA
BETWEEN STARTING END Y AND TERMINATING END X ⟿ S21

↓

FEATURE B(t) MATCHES
FEATURE OF DRONE ? ⟿ S22  →No→

↓Yes (SWITCH TO DIRECTION ESTIMATION MODE)

EMIT LASER LIGHT ⟿ S10

↓

GENERATE FEATURE B$_s$(t) IN EACH SECTION
FROM ACOUSTIC DATA OF EACH SECTION ⟿ S23

↓

FEATURE B$_s$(t) MATCHES
FEATURE OF DRONE ? ⟿ S24  →No→ (SWITCH TO DETECTION MODE)

↓Yes

CALCULATE CROSS-CORRELATION
FUNCTION REGARDING PAIR OF SECTIONS ⟿ S14

↓

CALCULATE DIRECTION CANDIDATES ⟿ S15

↓

DETERMINE ESTIMATED DIRECTION ⟿ S16    (SWITCH TO DETECTION MODE)

FIG. 10

OPTICAL FIBER SENSOR AND CHANGE DETECTION METHOD

This application is a National Stage Entry of PCT/JP2021/024168 filed on Jun. 25, 2021, the contents of all of which are incorporated herein by reference, in their entirety.

TECHNICAL FIELD

This invention relates to an optical fiber sensor and a change detection method using an optical fiber sensor.

BACKGROUND ART

Wide-area monitoring systems are used to monitor intrusions of suspicious persons or objects into large-scale important facilities such as airports and military bases. An example of an object to be monitored in a wide-area monitoring system is a drone. One method for monitoring drones is to use acoustic sensors such as microphones (refer to patent literature 1, for example). A drone flies while generating an acoustic signal specific to its flight condition. Therefore, by capturing the acoustic signal generated by the drone, the presence and direction of the drone can be detected. In patent literature 1, it is described that a drone is identified based on the result of matching the acoustic signal of the flying object obtained by the acoustic sensor and the previously obtained voice data.

There is also an estimation device that uses a plurality of microphones to estimate the direction of a sound source (refer to patent literature 2, for example). For example, a microphone array (a set of multiple microphones) is installed at a point. The estimation device estimates the direction from the microphone array to the drone using relative position information of each microphone and a relationship between the acoustic delay time measured from the output of each microphone.

However, when monitoring a large-scale facility, it is necessary to install a large number of microphone arrays. Therefore, a large cost is required to construct a wide-area monitoring system.

When constructing a wide-area monitoring system, optical fiber sensing, which uses an optical fiber sensor that can continuously monitor over a long distance, is useful in terms of cost and other factors. The optical fiber sensing is a technology that uses an optical fiber to measure sound and vibration. In the optical fiber sensing, the optical fiber itself becomes a sensor. In this description, a system that includes an optical fiber and a detector is called an optical fiber sensor. An acoustic sensor based on the optical fiber sensing are also sometimes referred to as an optical fiber microphone. A set of multiple optical fiber microphones is sometimes referred to as an optical fiber microphone array.

One type of optical fiber sensor is a distributed optical fiber sensor. As a distributed optical fiber sensor, there is an optical fiber sensor that uses a scattered light by Rayleigh scattering (Rayleigh scattered light), for example. Rayleigh scattering is scattering of light by fine particles (impurities) in the optical fiber core. A detection device in an optical fiber sensor that uses Rayleigh scattered light can detect physical change in the optical fiber caused by sound or vibration based on a signal obtained by detecting backscattered light due to Rayleigh scattering.

When a section of an optical fiber is affected by an incoming item (for example, incoming sound or vibration), the optical fiber expands or contracts in the section. In other words, strain occurs in the longitudinal direction of the optical fiber. As a result, the intensity (or amplitude) and phase of the backscattered light generated in the section changes. By observing the change of intensity or the change of phase, the effect of an incoming item can be detected. Therefore, the optical fiber sensor can be used as an acoustic sensor or a vibration sensor.

When observing change of the phase of the backscattered light, the detector may be configured to evaluate a difference (phase difference) between the phase of the backscattered light at the start point and the phase of the backscattered light at the end point in the section. Generally, such a section to be evaluated is called a gauge length. Hereinafter, the section to be evaluated (gauge length) is sometimes simply referred to as a section.

When an optical fiber sensor is installed instead of a large number of microphone arrays, a wide-area monitoring system for monitoring large-scale facilities can be constructed at low cost. In addition, when a wide-area monitoring system is constructed using an optical fiber sensor, it has the advantage of being more tolerant to environmental changes and less susceptible to electromagnetic noise than when using microphone arrays.

CITATION LIST

Patent Literature

PTL 1: Japanese Patent Application Publication No. 2017-72557
PTL 2: International Publication No. 2017/216999
PTL 3: Japanese Patent Application Publication No. 2012-68081

Non Patent Literature

NPL 1: R. O. Schmidt, "Multiple emitter location and signal parameter estimation", IEEE Transactions on Antennas and Propagation, vol. AP-34, NO. 3, NO. pp. 276-280, March 1986

SUMMARY OF INVENTION

Technical Problem

For example, if the total length of one optical fiber is set as a gauge length, a single optical fiber microphone is formed by the optical fiber. In that case, the performance of the optical fiber microphone with respect to sound collection is that of a single microphone. With a single microphone, it is difficult to accurately detect the location of a sound source when the level of the acoustic signal is low. This problem is especially occurred for an acoustic signal with an amplitude equal to or smaller than the background noise.

As a result, for example, a wide-area monitoring system configured to monitor intrusion of suspicious persons or suspicious objects using a single optical fiber microphone can monitor a wide area, but the accuracy of monitoring (for example, identifying the location of intrusion of a suspicious person or a suspicious object) is not high.

A method using the MUSIC (MUltiple SIgnal Classification) method for estimating a direction is described in non patent literature 1.

It is an object of the present invention to provide an optical fiber sensor and a change detection method with high detection performance when using optical fiber sensing to detect changes in the surrounding environment.

Solution to Problem

An optical fiber sensor according to the present invention includes setting means for setting a section to be evaluated set in the optical fiber to one of a first section and a plurality of second sections, each of which is shorter than the first section, extraction means for extracting a state change of light from the optical fiber, and detection means for detecting a change in the surrounding environment based on time-series data of the state change of light in the section to be evaluated.

A change detection method according to the present invention includes setting a section to be evaluated set in the optical fiber to one of a first section and a plurality of second sections, each of which is shorter than the first section, extracting a state change of light from the optical fiber, and detecting a change in the surrounding environment based on time-series data of the state change of light in the section to be evaluated.

A change detection program according to the present invention causes a computer to execute a process of setting a section to be evaluated set in the optical fiber to one of a first section and a plurality of second sections, each of which is shorter than the first section, a process of extracting a state change of light from the optical fiber, and a process of detecting a change in the surrounding environment based on time-series data of the state change of light in the section to be evaluated.

Advantageous Effects of Invention

According to the present invention, detection performance is improved when using optical fiber sensing to detect changes in the surrounding environment.

BRIEF DESCRIPTION OF DRAWINGS

FIG. 4 It depicts a block diagram showing an example configuration of a determination unit in first example embodiment.

FIG. 5 It depicts a block diagram showing an example configuration of a sound source direction estimation unit.

FIG. 7 It depicts an explanatory diagram for explaining the process of detecting the presence or absence of a sound source of a suspicious object based on acoustic amplitude data.

FIG. 8 It depicts a block diagram showing an example configuration of a determination unit in the second example embodiment.

FIG. 9 It depicts a flowchart showing an operation of the optical fiber sensor of the second example embodiment.

FIG. 10 It depicts a block diagram showing exemplary of a determination unit in the third example embodiment.

DESCRIPTION OF EMBODIMENTS

Hereinafter, example embodiments of the present invention will be explained with reference to the drawings.

In the following explanation, a drone flight sound and a vibration based on the approach of a suspicious object as a target of detection of a change in the surrounding environment of the optical fiber sensor is used an example. However, the example embodiments described below can also be applied to the detection of changes in the surrounding environment other than the drone flight sound. Other examples of changes in the surrounding environment include a temperature change, a state change of a structure in the vicinity of the optical fiber installation location, etc.

Figure 1:
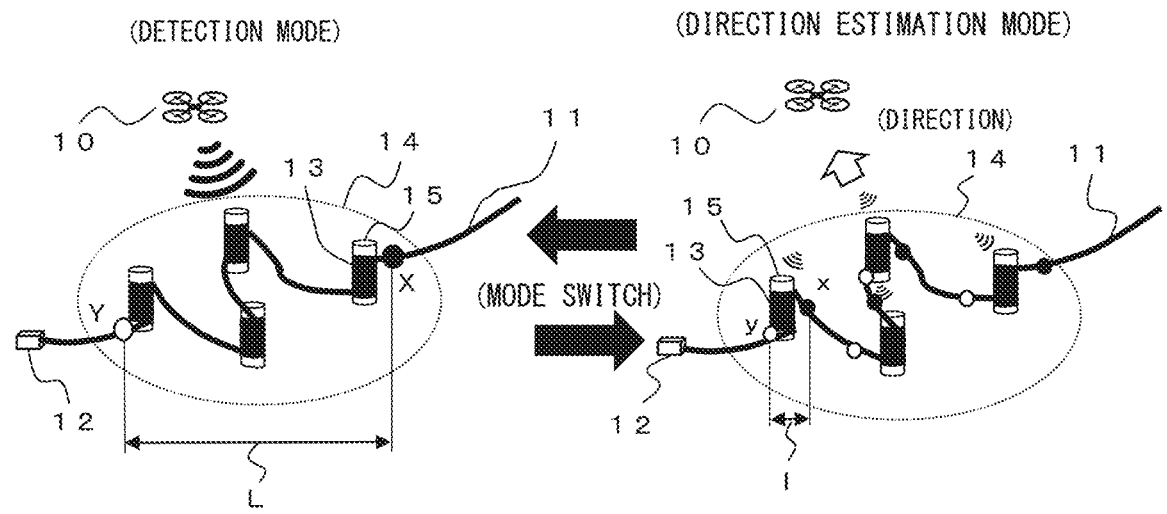
FIG. 1 It depicts an explanatory diagram for explaining an example configuration of an optical fiber sensor.

FIG. 1 is an explanatory diagram for explaining an example configuration of an optical fiber sensor. As shown in FIG. 1, the optical fiber sensor includes an optical fiber 11, a detector 12, and an optical fiber microphone array 14 that includes a plurality of optical fiber microphones 13. Four optical fiber microphones 13 are illustrated in FIG. 1. The number of optical fiber microphones 13 and their locations are arbitrary. For example, a plurality of optical fiber microphones 13 may be arranged in a single straight line. The plurality of optical fiber microphones 13 may be installed at any positions in a single plane. The plurality of optical fiber microphones 13 may be installed at any position in three-dimensional space.

In FIG. 1, the usage pattern in the detection mode is shown on the left side. The usage pattern in the direction estimation mode is shown on the right side. The detection mode is a mode for detecting sounds (for example, drone flight sounds) from a sound source (in this example embodiment, a drone) 10. The direction estimation mode is a mode for estimating the location of the sound source 10. Therefore, in the direction estimation mode, the direction of the sound source 10 is estimated. The section to be evaluated in the direction estimation mode is shorter than the section to be evaluated in the detection mode.

As shown in FIG. 1, a plurality of optical fiber microphones 13 are formed in the optical fiber 11 between the starting end (for example, location Y in detection mode in FIG. 1) and the terminating end (for example, location X in detection mode in FIG. 1). The optical fiber microphones 13 are formed by coiling the optical fiber 11 around a cylindrical resonant medium 15 which resonates to acoustic signals, so that no deflection occurs. In other words, the optical fiber microphone 13 is formed from the resonant medium 15 and the optical fiber 11. Each optical fiber microphone 13 may be formed by an entire length of the optical fiber 11 wound around the resonant medium 15, or by a portion of the optical fiber 11 wound around the resonant medium 15. When the acoustic signal (specifically, sound pressure) causes distortion in the resonant medium 15, the optical fiber 11 expands and contracts in accordance with the magnitude of the acoustic signal. The path length of light passing through the optical fiber 11 then changes. As a result, the amplitude and the phase of the backscattered light due to Rayleigh scattering changes. The detector 12 may detect a change in the environment surrounding the optical fiber sensor based on a change in the phase of the backscattered light.

The optical fiber microphone 13 with a cylindrical resonant medium 15 is disclosed in patent literature 3, for example.

In FIG. 1, L indicates a section to be evaluated in the detection mode. A section to be evaluated may be expressed as a measurement section. In the example shown in FIG. 1, in the detection mode, the section to be evaluated L (first section) is defined by the total length of the optical fiber 11 between the starting end Y and the terminating end X.

Figure 2:
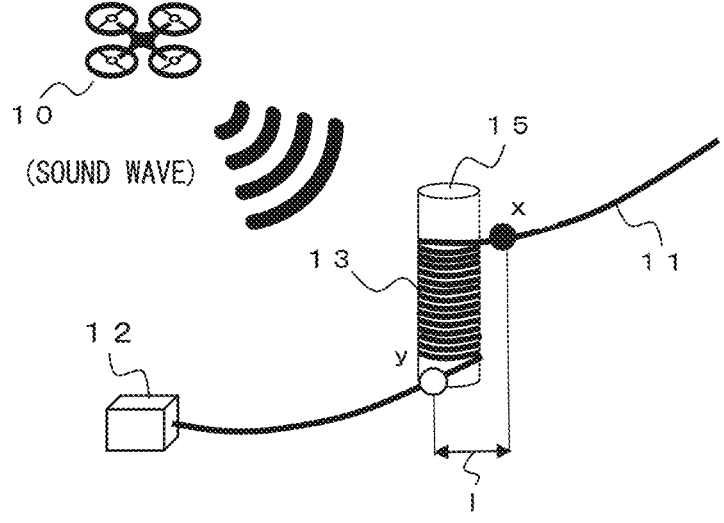
FIG. 2 It depicts an explanatory diagram for explaining a section to be evaluated in the direction estimation mode.

FIG. 2 is an explanatory diagram for explaining a section to be evaluated in the direction estimation mode. As shown in FIG. 2, in the direction estimation mode, the section to be evaluated 1 (second section) is defined by the total length of the optical fiber 11 between the start point y and the end point x of the section where the optical fiber 11 is wound around the resonant medium 15. The interval between the start point y and the end point x is called a section. Although one optical fiber microphone 13 is shown in FIG. 2, the section to be evaluated 1 is defined in the same way for the other optical fiber microphones 13 included in the optical fiber microphone array 14. Four sections to be evaluated 1 are illustrated in FIG. 1.

In the example shown in FIG. 1, in the direction estimation mode, the portion of the optical fiber 11 corresponding to the resonant medium 15 is used as the respective optical fiber microphones 13 (in the example shown in FIG. 1, four optical fiber microphones 13). In other words, the section to be evaluated is set corresponding to the resonant medium 15. However, the section to be evaluated may be set across two or more resonant medium 15. Under the condition that $1 \leq L/2$ is satisfied, there are two or more portions in the optical fiber microphone array 14 that can be regarded as optical fiber microphones 13, ensuring that the optical fiber microphone array 14 has a direction estimation capability.

In practice, the section to be evaluated is defined by the detector 12 setting a measurement point (for example, start point y) and a reference point (for example, end point x) that is separated from it by the distance of the measurement section. The fact that the detector 12 sets the measurement point and the reference point means that the detector 12 calculates a difference in the phase information of the backscattered light received from the measurement point and the reference point after a predetermined time from the time when the light was emitted from the light source built in the detector 12, and regards he phase difference signals obtained by the respective optical fiber microphones 13 as an acoustic signal obtained by the each optical fiber microphone 13 when the sound is received by each optical fiber microphone 13. The predetermined time is a time from the emission of light from the light source to the return of backscattered light from the measurement and the reference point. The direction detection of a drone is performed based on an acoustic arrival time difference of the acoustic signals obtained by respective optical fiber microphones 13.

In the detection mode, the optical fiber sensor operates to detect sounds generated in the vicinity of the optical fiber microphone array 14. In the detection mode, the optical fiber microphone array 14 substantially functions as a single omnidirectional microphone. In the direction estimation mode, each of the plurality of optical fiber microphones 13 in the optical fiber sensor functions as a microphone.

The sound detection performance of the optical fiber sensor operating in detection mode is higher than when each of the multiple optical fiber microphones 13 is functioning. For example, suppose that there are n optical fiber microphones 13 in the optical fiber microphone array 14. Suppose also that the noise in the acoustic signal is a white noise following Gaussian distribution. Based on the principle of synchronous addition, the signal-to-noise ratio by the entire optical fiber microphone array 14 is expected to be/n times the signal-to-noise ratio by the individual optical fiber microphones 13.

Example Embodiment 1

Configuration of Example Embodiment

Figure 3:
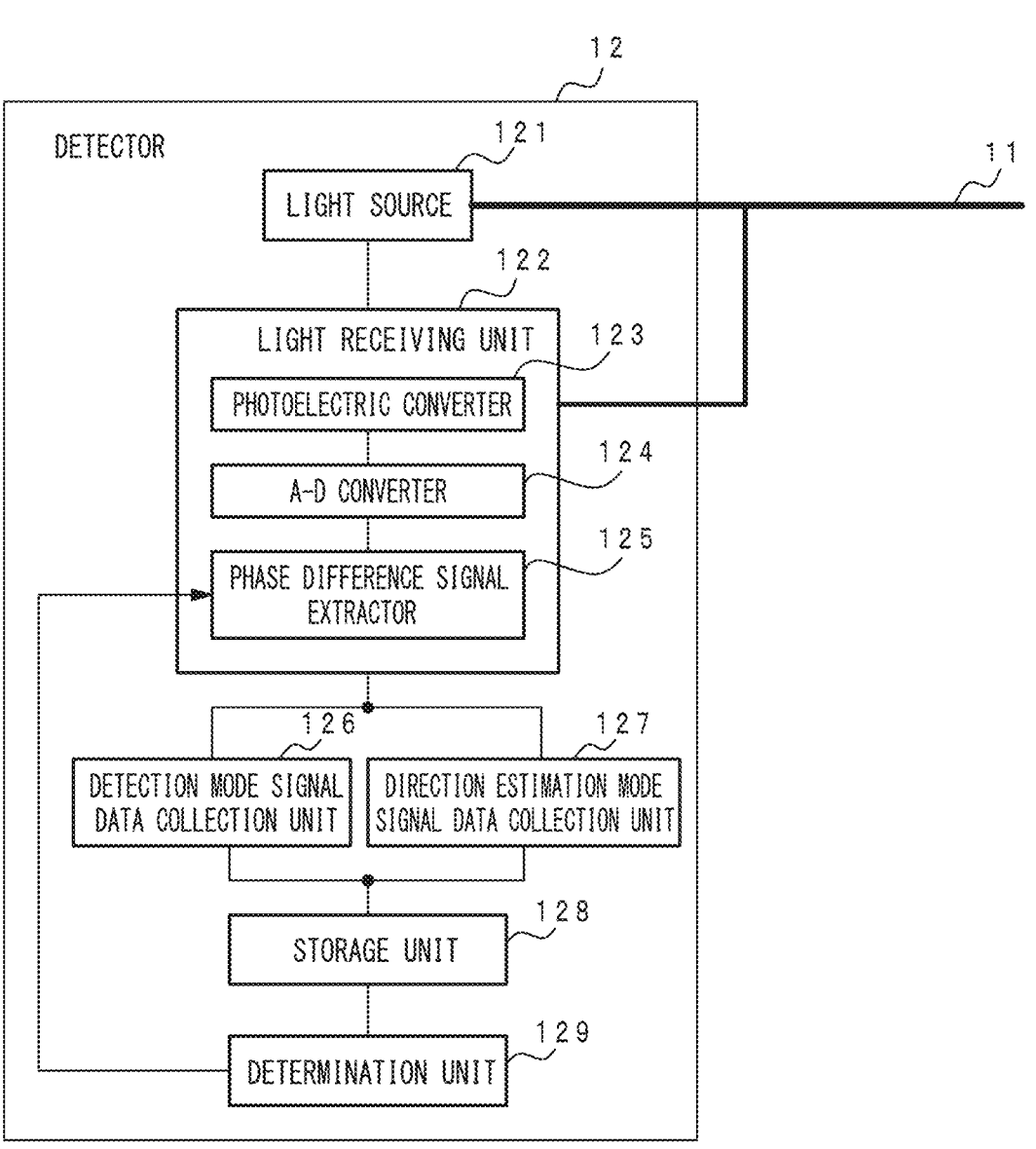
FIG. 3 It depicts a block diagram showing an example configuration of the optical fiber sensor of the first example embodiment.

FIG. 3 is a block diagram showing an example configuration of the optical fiber sensor of the first example embodiment. In the example shown in FIG. 1, the detector 12 in the optical fiber sensor includes a light source 121, a light receiving unit 122, a detection mode signal data collection unit 126, a direction estimation mode signal data collection unit 127, a storage unit 128, and a determination unit 129.

The light source 121 is a laser light source that emits laser light, for example. For example, the light source 121 emits a pulsed laser light (pulsed light) into the optical fiber 11 according to an instruction of the determination unit 129. The spatial resolution is defined by a pulse width of the pulsed light.

The light receiving unit 122 receives a backscattered light from the optical fiber 11 due to Rayleigh scattering. An optical circulator (not shown in FIG. 1) or the like is installed between the optical fiber 11, and the light source 121 and the light receiving unit 122 to separate the optical signal. The light receiving unit 122 includes a photoelectric converter 123, an A-D converter 124, and a phase difference signal extractor 125.

The photoelectric converter 123 is for example, a photodiode (PD) that converts an optical signal into an electrical signal. The electrical signal converted by the PD includes information on intensity and phase. In this example embodiment, the phase information is extracted. The A-D converter 124 converts the electrical signal, which is an analog signal, into a digital electrical signal. The phase difference signal extractor 125 extracts the phase difference information of the section to be evaluated (hereinafter referred to as "section") from phase information obtained by the A-D converter 124 according to the information from the determination unit 129 (information indicating whether the mode is detection mode or direction estimation mode) and uses it as phase difference signal. In other words, the phase difference signal extractor 125 recognizes whether the section to be evaluated is the first section or the second section according to the information from the determination unit 129. For example, the phase difference at the end point x of the section in FIG. 2 is used as the phase difference. The phase difference at the end point x of the section is calculated, as an example, as follows.

In the detection mode, the phase of the backscattered light at the start point y of the section is P(y) and the phase of the backscattered light at the end point x is P(x). The phase difference is $\Delta P = P(x) - P(y)$. The reception time of the backscattered light from the end point x is determined by the emission time of the laser light and the distance from the light source 121 to the end point x. The reception time of the backscattered light from the start point y is determined by the emission time of the laser light and the distance from the light source 121 to the start point y. Therefore, the phase difference signal extractor 125 may determine whether the received backscattered light is the backscattered light from the end point x or from the start point y based on the time when the backscattered light is received. As a result, the phase difference signal extractor 125 may calculate a phase difference of the section.

In the direction estimation mode, the phase of the back-scattered light at the start point of the section (starting end Y) is P(Y), and the phase of the backscattered light at the end point of the section (terminating end X) is P(X). The phase difference is ΔP=P(X)–P(Y).

The phase difference signal extractor 125 provides the phase difference signal to the detection mode signal data collection unit 126 and the direction estimation mode signal data collection unit 127. Hereinafter the output of the phase difference signal extractor 125 is referred to as acoustic data. The detection mode signal data collection unit 126 collects acoustic data from time to time in the detection mode and stores it in the storage unit 128. Collecting from time to time means capturing acoustic data at a pre-determined sampling cycle. The direction estimation mode signal data collection unit 127 collects acoustic data from time to time in the direction estimation mode and stores it in the storage unit 128.

In the detection mode, the determination unit 129 determines whether or not an abnormal sound has occurred in the vicinity of the optical fiber microphone array 14 using the acoustic data stored in the storage unit 128 (data including information on phase differences in the section collected from time to time by the detection mode signal data collection unit 126). In the direction estimation mode, the determination unit 129 generates time-series data of the phase difference of the section for each individual optical fiber microphone 13 using the acoustic data stored in the storage unit 128 (data including information on the phase difference of the section collected from time to time by the direction estimation mode signal data collection unit 127). The determination unit 129 estimates the direction of the sound source of the abnormal sound using the time-series data of the phase difference of each section. In this example embodiment and other example embodiments, a sound (in this and other example embodiments, a drone flight sound) generated by a suspicious object (in this example embodiment and other example embodiments, a drone (sound source 10)) is referred to as an abnormal sound.

In this example embodiment, when the presence of a sound source of abnormal sound is detected in the detection mode, the determination unit 129 switches the operation mode from the detection mode to the direction estimation mode. Although the direction of the abnormal sound source is estimated in the direction estimation mode, when the determination unit 129 re-determines that no abnormal sound source exists in the direction estimation mode, the operation mode is switched back to the detection mode from the direction estimation mode.

FIG. 4 is a block diagram showing an example configuration of the determination unit 129. In the example shown in FIG. 4, the determination unit 129 includes an amplitude calculation unit 131, an amplitude comparison unit 132, a section amplitude calculation unit 141, a section amplitude comparison unit 142, and a sound source direction estimation unit 145.

The amplitude calculation unit 131 and the amplitude comparison unit 132 operate in detection mode. The section amplitude calculation unit 141, the section amplitude comparison unit 142, and the sound source direction estimation unit 145 operate in direction estimation mode.

In this example embodiment, the amplitude calculation unit 131 generates time-series data of the amplitude of the acoustic data (phase difference signals, i.e., data including phase differences of sections collected from time to time by the detection mode signal data collection unit 126) stored in the storage unit 128. Hereinafter, the time-series data of amplitude with respect to the time-series data of phase difference of a section is referred to as acoustic amplitude data.

When the amplitude comparison unit 132 detects a characteristic difference in the acoustic amplitude data from the time series-data of the amplitude when there is no sound-generating object in the vicinity of the optical fiber microphone array 14, the amplitude comparison unit 132 determines that a suspicious object such as a drone exists in the vicinity of the optical fiber microphone array 14. When the determination unit 129 determines that a suspicious object exists, the determination unit 129 switches the operation mode to the direction estimation mode.

Hereinafter, the amplitude time-series data when there is no sound-generating object in the vicinity is also referred to as normal time-series data. The normal time-series data also includes noises in the vicinity of the optical fiber microphone array 14.

The section amplitude calculation unit 141 generates the acoustic amplitude data for each section from the acoustic data stored in the storage unit 128 (data including information on the phase differences of the sections collected from time to time by the direction estimation mode signal data collection unit 127). When the section amplitude comparison unit 142 determines that none of the acoustic amplitude data of each section is characteristically different from the normal time-series data, the determination unit 129 switches the operation mode to the detection mode.

In this example embodiment, the determination unit 129 performs processing using the acoustic data stored in the storage unit 128, but the output (acoustic data) of the detection mode signal data collection unit 126 and the direction estimation mode signal data collection unit 127 may be directly input to perform processing.

FIG. 5 is a block diagram showing an example configuration of the sound source direction estimation unit 145. In the example shown in FIG. 5, the sound source direction estimation unit 145 includes a cross-correlation calculation unit 151, a sound source direction calculation unit 152, and a sound source direction determination unit 153.

The cross-correlation calculation unit 151 calculates a cross-correlation function regarding a plurality of pairs of optical fiber microphones 13 (also a plurality of pairs of sections) in the optical fiber microphone array 14. The sound source direction calculation unit 152 obtains candidates of direction of the sound source of the abnormal sound using the cross-correlation function. The sound source direction determination unit 153 determines the estimated direction from the candidates of direction.

Operation of the Example Embodiment

Next, the operation of the optical fiber sensor of the first example embodiment is explained with reference to the flowchart in FIG. 6.

The light source 121 emits a laser light into the optical fiber 11 (step S1). The emitted laser light is a pulsed light. The emission interval (cycle) of the laser light (pulsed light) is preferably longer than the time from the emission of the laser light until the backscattered light at the terminating end X is received. As an initial condition, the operation mode is set to detection mode. Specifically, the determination unit 129 operates in the detection mode.

As described above, a backscattered light due to Rayleigh scattering in the optical fiber 11 is received by the light receiving unit 122. Acoustic data is stored in the storage unit

128 through the photoelectric converter 123, the A-D converter 124, and the detection mode signal data collection unit 126.

In the determination unit 129, the amplitude calculation unit 131 generates acoustic amplitude data from the acoustic data (data including phase differences of sections collected from time to time by the detection mode signal data collection unit 126) stored in the storage unit 128 (step S2). The acoustic amplitude data generated in the process of step S2 is time-series data of amplitudes regarding the section from the starting end Y to the terminating end X of the optical fiber 11. The amplitude calculation unit 131 calculates the amplitude time average A(t) from the acoustic amplitude data (step S3). The amplitude time average A(t) is calculated as in the following equation (1).

[Math. 1]

$$A_T(t) = \frac{1}{T}\int_{t-\tau}^{\tau} ds |f(s)| \tag{1}$$

In equation (1), T denotes a period for which the time average is to be calculated. |f(s)| denotes an acoustic amplitude data. In this example embodiment, the time average of the amplitude is used, but the square average of the amplitude may also be used.

FIG. 7 is an explanatory diagram for explaining the process of detecting the presence or absence of a sound source of a suspicious object (drone (sound source 10)) in the vicinity of the optical fiber microphone array 14 based on the acoustic amplitude data. In FIG. 7, the signals are shown in the form of analog electrical signals before being A-D converted.

In FIG. 7, an example of acoustic data is shown as a vibration waveform in black at the upper row. In addition, an example of the acoustic data after denoising by, for example, the spectral subtraction method is shown as a denoising waveform in light color. In the example shown in the upper row of FIG. 7, three high-amplitude sections due to factors other than a noise occur in the area where the denoised waveform takes a finite value (refer to the area surrounded by rectangles in FIG. 7).

In FIG. 7, an example of acoustic amplitude data is shown as an amplitude waveform in black at the lower row. In addition, in light color, an example of amplitude time average A(t) is shown as an amplitude average. In the example shown in the lower row of FIG. 7, the amplitude time average A(t) is a steady, almost constant value due to steady noise, but changes abruptly in response to the occurrence of three high-amplitude sections that are different from a noise.

Therefore, by comparing the amplitude time average A(t) with a predetermined threshold value (refer to the white line in the lower row of FIG. 7), it is possible to detect whether or not a suspicious object, i.e., the sound source 10, is present. As the suspicious object approaches the optical fiber microphone array 14, the value of the amplitude time average A(t) due to the sound of the suspicious object becomes larger. Therefore, for example, it is possible to determine whether or not a suspicious object is approaching by comparing the value of the amplitude time average A(t) with multiple threshold values.

In the determination unit 129, the amplitude comparison unit 132 compares the amplitude time average A(t) with a predetermined threshold value (step S4). The threshold value is a value that can discriminate sounds from suspicious objects with respect to normal time-series data. When the amplitude comparison unit 132 determines in step S4 that the amplitude time average A(t) is less than or equal to the threshold value, it is determined that there are no suspicious objects in the vicinity of the optical fiber microphone array 14. In that case, the optical fiber sensor executes the process from step S1 again. When the amplitude comparison unit 132 determines that there is a portion exceeding the threshold value in the amplitude time average A(t), the optical fiber sensor executes the processes from step S10 onward. The processes after step S10 is in the direction estimation mode. That is, the optical fiber sensor switches the operation mode to the direction estimation mode. At this time, the determination unit 129 provides the phase difference signal extractor 125 with information indicating that it is in the direction estimation mode.

In the process of step S4, when the amplitude comparison unit 132 determines that one or more portions exceeding the threshold value exist in the amplitude time average A(t), the determination unit 129 may switch the operation mode to the direction estimation mode. However, when the amplitude comparison unit 132 determines that the amplitude time average A(t) has more than a predetermined number of portions exceeding the threshold value, the determination unit 129 may switch the operation mode to the direction estimation mode.

In step S10, the light source 121 emits a pulsed light into the optical fiber 11. The width of the pulsed light (pulse width) is defined by the time interval between the rising edge of the pulse signal and the half-value point of the peak power, and the falling half-value point, for example.

As described above, a backscattered light due to Rayleigh scattering in the optical fiber 11 is received by the light receiving unit 122. Acoustic data is stored in the storage unit 128 through the photoelectric converter 123, the A-D converter 124, and the direction estimation mode signal data collection unit 127.

The section amplitude calculation unit 141 generates acoustic amplitude data in the section corresponding to each of the optical fiber microphones 13 from the acoustic data (step S11). The amplitude calculation unit 131 also calculates an amplitude time average $A_s$ (t) from the acoustic amplitude data (step S12). s is from 1 to n, where n=4 in the example shown in FIG. 1. The method for calculating the amplitude time average $A_s$ (t) is the same as the method for calculating the amplitude time average A (t) (refer to equation (1)). The acoustic amplitude data generated in the process of step S12 is the time-series data of the amplitude regarding the section from the start point y to the end point x of each of the optical fiber microphones 13.

The section amplitude comparison unit 142 compares each of the amplitude time averages $A_s$ (t) with a predetermined threshold value (step S13). The threshold value is a value that can identify sounds from suspicious objects with respect to the normal time-series data. When the section amplitude comparison unit 142 determines in step S13 that all amplitude time averages $A_s$ (t) are less than or equal to the threshold value, it is determined that no suspicious objects exist in the vicinity of the optical fiber microphone array 14. In that case, the optical fiber sensor executes the process from step S1 again. In other words, the optical fiber sensor switches its operation mode from the direction estimation mode to the detection mode. At this time, the determination unit 129 provides the phase difference signal extractor 125 with information indicating that it is in the detection mode. When the section amplitude comparison unit 142 determines that there is a portion exceeding the threshold value in one or more amplitude time averages $A_s$ (t), the optical fiber sensor executes the processes from step S14 onward.

By executing the process of step S13, it prevents an erroneous determination that a suspicious object exists when the determination result of the determination unit 129 in the detection mode (in this case, the determination result that a suspicious object exists) occurs due to an accidental factor, that is, when the suspicious object does not actually exist.

In the processes of steps S14 to S16, the sound source direction estimation unit 145 estimates the direction of the sound source 10. In this example implementation, the sound source direction estimation unit 145 estimates the direction of the sound source 10 (suspicious object) using the time difference of arrival (TDOA).

TDOA is expressed by the following equation (2). In equation (2), c denotes the speed of sound. d denotes the distance between the optical fiber microphones 13. θ denotes the direction of the sound source 10 (for example, the elevation angle from the optical fiber 11).

$$TDOA = d \cdot \cos \theta / c \qquad (2)$$

Therefore, the direction can be obtained by the following equation (3).

$$\theta = \cos^{-1}(TDOA \cdot c)/d \qquad (3)$$

In the sound source direction estimation unit 145, the cross-correlation calculation unit 151 calculates a cross-correlation function of the acoustic data of two sections (corresponding to the optical fiber microphones 13) (step S14). When two sections are expressed as a pair, the cross-correlation calculation unit 151 calculates cross-correlation functions for all pairs that can be selected from multiple sections. In the example shown in FIG. 1, since four optical fiber microphones 13 are formed, the number of pairs is six. Therefore, the cross-correlation calculation unit 151 calculates six cross-correlation functions.

The cross-correlation function is expressed as a function of time t, and the TDOA can be estimated from the time t that maximizes the value of the cross-correlation function. The sound source direction calculation unit 152 estimates the TDOA for each pair. Then, the sound source direction calculation unit 152 calculates the direction of the sound source 10 regarding each pair using the each TDOA (step S15). Each of the calculated directions is considered as a direction candidate of the sound source.

The sound source direction determination unit 153 determines the most likely correct sound source direction from among multiple direction candidates of the sound source by performing maximum likelihood estimation, for example (step S16).

As explained above, in this example embodiment, the determination unit 129 forms substantially one omni-directional microphone by increasing the section to be evaluated, and determines whether or not the sound source 10 is present by one omni-directional microphone. When it is determined that the sound source 10 is present, the determination unit 129 may estimate the direction of the sound source 10 with higher precision than the omni-directional microphone, by decreasing the section to be evaluated, i.e., by using multiple optical fiber microphones 13. Therefore, the detection performance when detecting changes in the surrounding environment is improved in this example embodiment.

The method of estimating a sound source direction using multiple optical fiber microphones 13 is not limited to the above method. For example, a whitened cross-correlation function may be used instead of a cross-correlation function to estimate the TDOA. The method of estimating the sound source direction may also be used without using TDOA, as described in NPL 1.

Example Embodiment 2

Configuration of Example Embodiment

The overall configuration of the optical fiber sensor of the second example embodiment is the same as that of the first example embodiment. FIG. 8 is a block diagram showing an example configuration of the determination unit 129 in the second example embodiment. In the example shown in FIG. 8, the determination unit 129 includes the section amplitude calculation unit 141, the sound source direction estimation unit 145, a feature extraction unit 231, a feature determination unit 232, a section feature extraction unit 241, and a section feature determination unit 242.

The feature extraction unit 231 and the feature determination unit 232 operate in detection mode. The section amplitude calculation unit 141, the sound source direction estimation unit 145, the section feature extraction unit 241, and the section feature determination unit 242 operate in the direction estimation mode.

The feature extraction unit 231 extracts features from acoustic data. Specifically, the feature extraction unit 231 calculates acoustic features (hereinafter referred to as feature) from acoustic data, for example. The feature determination unit 232 determines whether the calculated feature is based on the sound generated by a suspicious object (in this example embodiment, a drone). The section feature extraction unit 241 extracts the feature of each section from the acoustic data. The section feature determination unit 242 determines whether the calculated feature is based on the sound generated by the suspicious object.

The section amplitude calculation unit 141 and the sound source direction estimation unit 145 operate in the same manner as those in the first example embodiment.

Operation of the Example Embodiment

Next, the operation of the optical fiber sensor of the second example embodiment is explained with reference to the flowchart in FIG. 9.

As in the first example embodiment, the light source 121 emits a laser light into the optical fiber 11 (step S1). In addition, in this example embodiment, the operating mode is set to detection mode as the initial state. Specifically, the determination unit 129 operates in the detection mode. As in the first example embodiment, a backscattered light due to Rayleigh scattering in the optical fiber 11 is received by the light receiving unit 122. Acoustic data is stored in the storage unit 128 through the photoelectric converter 123, the A-D converter 124, and the detection mode signal data collection unit 126.

In this example embodiment, the determination unit 129 determines whether or not a suspicious object, i.e., a sound source 10, exists in the vicinity of the optical fiber microphone array 14 based on the feature extracted from the acoustic data (i.e., feature value). In the determination unit 129, the feature extraction unit 231 calculates the feature B(t) from the acoustic data stored in the storage unit 128 (step S21). There are various indices of feature.

For example, the duration of a characteristic sound (a sound that deviates from the amplitude of the normal time-series data) or a frequency derived from the acoustic data is used as an index of feature.

When frequency is used, the feature extraction unit 231 generates acoustic amplitude data from the acoustic data stored in the storage unit 128. The acoustic amplitude data is time-series data of amplitudes related to the section from the starting end Y to the terminating end X of the optical fiber 11. The feature extraction unit 231 then applies, for example, a fast Fourier transform (FFT) to the acoustic data to obtain a frequency spectrum. When the duration of the characteristic sound is used, the feature extraction unit 231 obtains an envelope of the acoustic data, for example. The frequency spectrum and the duration of the characteristic sound may be used together.

The feature determination unit 232 determines whether or not the calculated feature B(t) matches the acoustic feature of the suspicious object (drone) (step S22). In this example embodiment, a classifier is generated that has been learned in advance using the acoustics from the suspicious object actually observed as training data. The classifier is incorporated into the feature determination unit 232. The feature determination unit 232 inputs the feature B(t) to the classifier and obtains from the classifier a determination result as to whether or not the acoustic data presenting the feature B(t) is the acoustic data for the presence of a suspicious object, i.e., whether a suspicious object is present or not.

When it is determined that no suspicious object exists, the optical fiber sensor executes the process from step S1 again. When it is determined that a suspicious object exists, the optical fiber sensor executes the process of step S10 and processes from step S23 onward. The process of step S10 and the processes from step S23 onward are processes in the direction estimation mode. That is, the optical fiber sensor switches the operation mode to the direction estimation mode. At this time, the determination unit 129 provides the phase difference signal extractor 125 with information indicating that it is in the direction estimation mode.

The feature determination unit 232 may compare the calculated feature B(t) with the feature as a template based on the acoustics from the suspicious object actually observed in advance. In such a case, the feature determination unit 232 determines that a suspicious object is present when the difference between both feature is less than a predetermined threshold value.

As in the first example embodiment, the light source 121 emits a laser light into the optical fiber 11. The section feature extraction unit 241 generates acoustic amplitude data for the section corresponding to the respective optical fiber microphone 13 from the acoustic data (data including information on the phase difference of the section collected from time to time by the direction estimation mode signal data collection unit 127) (step S23). The section feature extraction unit 241 also calculates $B_s$ (t) for each section from the acoustic data (step S23). s is from 1 to n, where n=4 in the example shown in FIG. 1. The method of calculating the feature $B_s$ (t) for each section is the same as the method of calculating the feature B (t). The acoustic data generated by the process of step S23 is the time-series data of the phase difference regarding the section from the start point y to the end point x of each of the optical fiber microphones 13.

The section feature determination unit 242 determines whether or not the calculated feature $B_s$ (t) for each section matches the acoustic features of the suspicious object (drone) (step S24). The method of determination by the section feature determination unit 242 is the same as the method of determination by the feature determination unit 232.

When the section feature determination unit 242 determines that the feature values $B_s$ (t) regarding all the sections do not match the acoustic feature of the suspicious object, it is determined that there is no suspicious object in the vicinity of the optical fiber microphone array 14. In that case, the optical fiber sensor executes the process from step S1 again. In other words, the optical fiber sensor switches the operation mode from the direction estimation mode to the detection mode. At this time, the determination unit 129 provides the phase difference signal extractor 125 with information indicating that it is in the detection mode. When the section feature determination unit 242 determines that one or more feature values $B_s$ (t) match the acoustic feature of the suspicious object, the optical fiber sensor executes the processes from step S14 onward.

By executing the process of step S24, it prevents an erroneous determination that a suspicious object exists when the determination result of the determination unit 129 in the detection mode (in this case, the determination result that a suspicious object exists) occurs due to an accidental factor, that is, when the suspicious object does not actually exist.

The processes of steps S14-S16 is the same as in the first example embodiment.

As explained above, in this example embodiment, as in the first example embodiment, the determination unit 129 forms substantially one omni-directional microphone by increasing the section to be evaluated, and determines whether or not the sound source 10 is present by one omni-directional microphone. When it is determined that the sound source 10 is present, the determination unit 129 may estimate the direction of the sound source 10 with higher precision than the omni-directional microphone, by decreasing the section to be evaluated, i.e., by using multiple optical fiber microphones 13. Therefore, the detection performance when detecting changes in the surrounding environment is improved in this example embodiment.

Example Embodiment 3

In addition to the approach of drones, etc., (the presence of a suspicious object in the vicinity of the optical fiber microphone array 14) to the optical fiber microphone array 14, the optical fiber sensor may detect an intrusion of a suspicious person or a suspicious object into a facility or the like where the optical fiber sensor is installed. The optical fiber sensor of the third example embodiment is an optical fiber sensor that can also detect intrusion of a suspicious person or a suspicious object. The following is an example of an optical fiber sensor installed in a predetermined facility.

The optical fiber sensor detects a vibration caused by an intrusion of a suspicious person or a suspicious object into the facility. The approach of a suspicious object is also detected as a vibration based on sound pressure in practice. Hereinafter, a vibration based on sound pressure is referred to as a non-contact vibration, while a vibration resulting from an intrusion of a suspicious person or a suspicious object is referred to as a contact vibration. In general, an acoustic signal resulting from a contact vibration is locally louder than it resulting from a non-contact vibration. Therefore, based on the intensity (or amplitude) of the observed acoustic signal and the duration of the period of high intensity (or amplitude) in an audio signal, the optical fiber sensor may determine whether the acoustic signal caused by a contact vibration or a non-contact vibration is observed. Although the data related to a contact vibration is essentially vibration data, since the acoustic data stored in the storage unit 128 is handled with respect to the detection of a contact vibration, the vibration data is also expressed as generating the acoustic amplitude data regarding a section from the acoustic data.

Configuration of Example Embodiment

Figure 10:
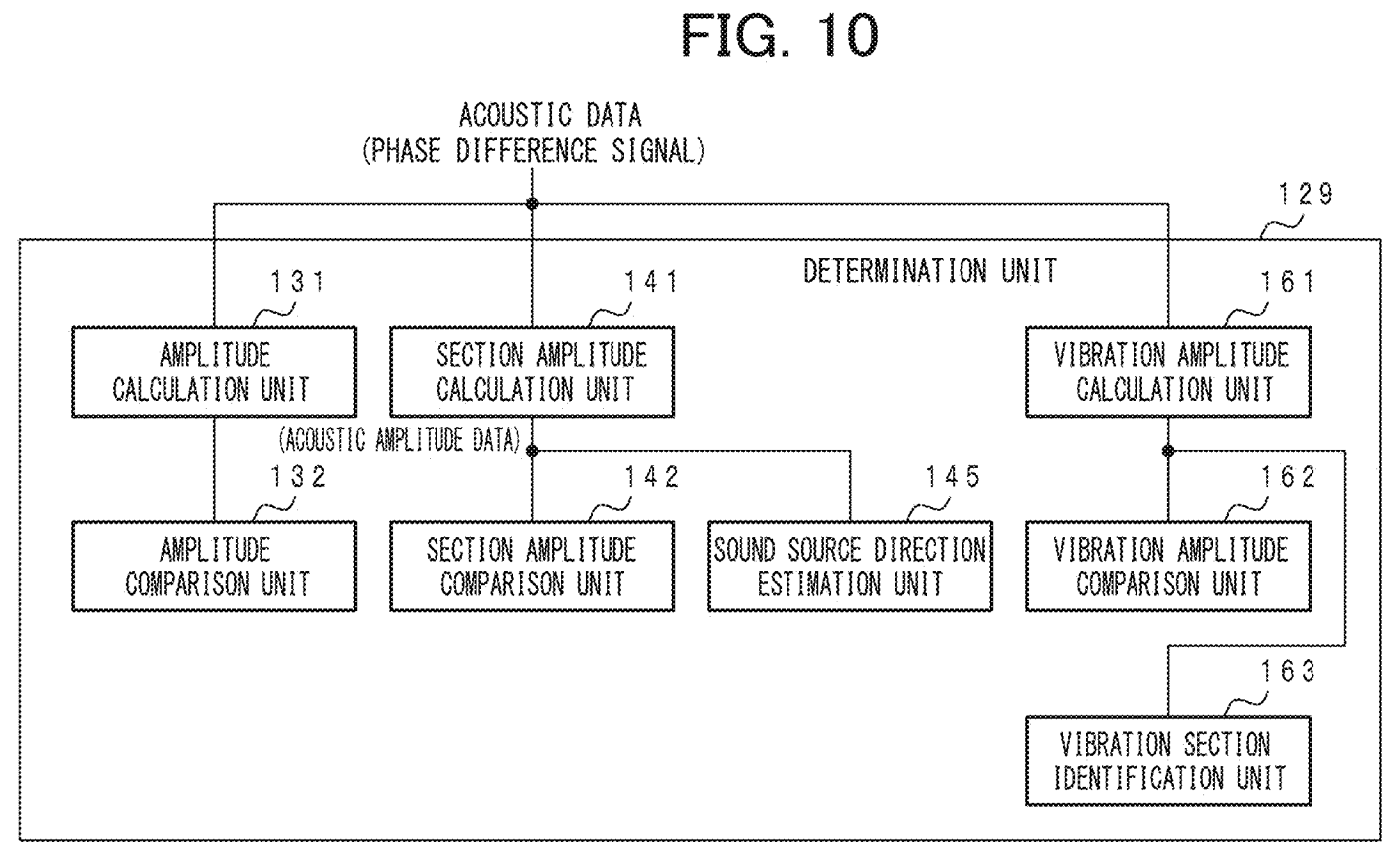

The overall configuration of the optical fiber sensor of the third example embodiment is the same as that of the first example embodiment. FIG. 10 is a block diagram showing an example configuration of the determination unit 129 in the third example embodiment. In the example shown in FIG. 10, the determination unit 129 includes the amplitude calculation unit 131, the amplitude comparison unit 132, the section amplitude calculation unit 141, the section amplitude comparison unit 142, the sound source direction estimation unit 145, a vibration amplitude calculation unit 161, a vibration amplitude comparison unit 162, and a vibration section identification unit 163. In other words, the vibration amplitude calculation unit 161, the vibration amplitude comparison unit 162, and the vibration section identification unit 163 are added to the determination unit 129 in this example embodiment with respect to the configuration of the first example embodiment.

The vibration amplitude calculation unit 161 generates acoustic amplitude data for each section from the acoustic data stored in the storage 128. The vibration amplitude comparison unit 162 determines whether or not vibration has occurred in any of the sections based on the acoustic amplitude data. The vibration section identification unit 163 identifies the section where an intrusion of a suspicious person or object using the determination results of the vibration amplitude comparison unit 162.

$A_s$ in the first example embodiment, the feature extraction unit 231 and the feature determination unit 232 operate in the detection mode. The section amplitude calculation unit 141, the sound source direction estimation unit 145, the section feature extraction unit 241, and the section feature determination unit 242 operate in the direction estimation mode.

In this example embodiment, the vibration amplitude calculation unit 161, the vibration amplitude comparison unit 162, and the vibration section identification unit 163 operate in parallel with the feature extraction unit 231 and the feature determination unit 232 associated with the detection mode or the section feature extraction unit 241 and the section feature determination unit 242 associated with the direction estimation mode.

Operation of the Example Embodiment

Figure 11:
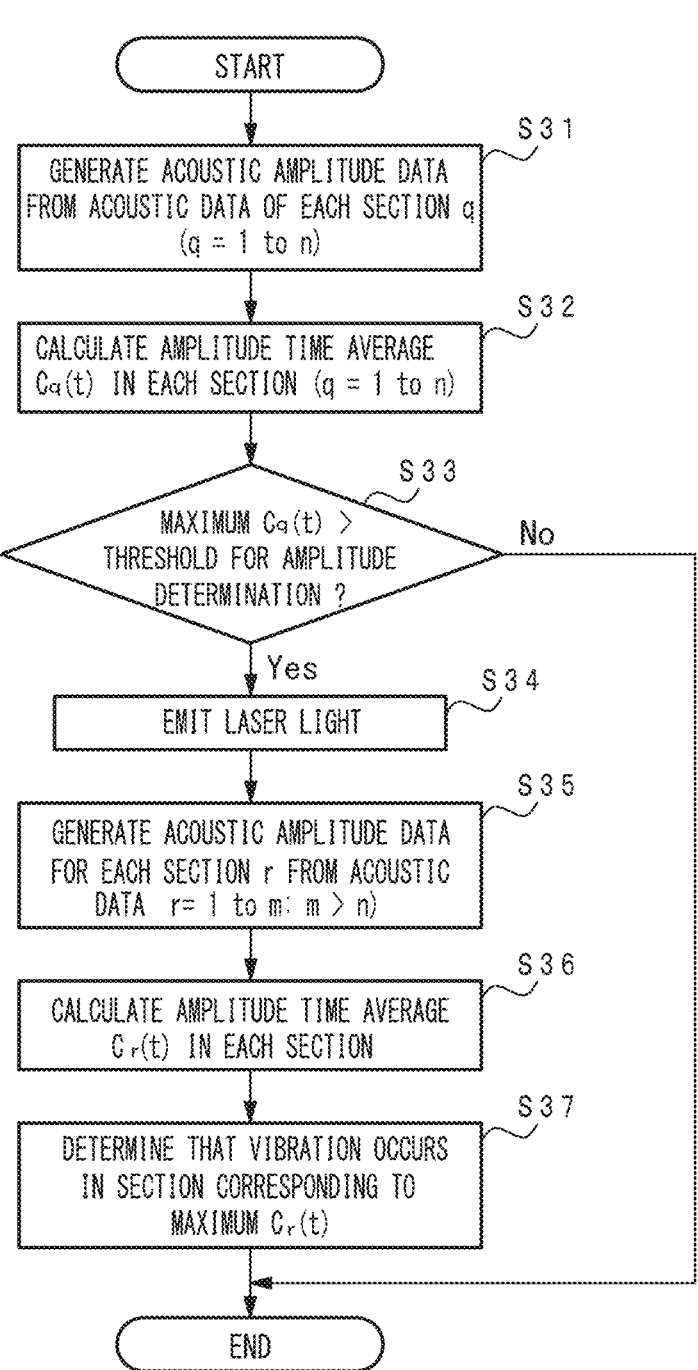
FIG. 11 It depicts a flowchart showing an operation of the optical fiber sensor of the third example embodiment.

Next, the operation of the optical fiber sensor of the third example embodiment is described with reference to the flowchart in FIG. 11. The process shown in FIG. 11 is the process executed by the vibration amplitude calculation unit 161 and the vibration amplitude comparison unit 162. In parallel with the process shown in FIG. 11, the process shown in FIG. 6 in the first example embodiment is executed.

The vibration amplitude calculation unit 161 generates the acoustic amplitude data for the section corresponding to each of the optical fiber microphones 13 from the acoustic data stored in the storage unit 128 (step S31). The vibration amplitude calculation unit 161 also calculates the amplitude time average $C_q$ (t) from the acoustic amplitude data (step S32). q is from 1 to n, where n=4 in the example shown in FIG. 1. The method of calculating the amplitude time average $C_q$ (t) is the same as the method of calculating the amplitude time average A (t) by the amplitude calculation unit 131 in the first example embodiment (refer to equation (1)). However, here, T in equation (1) is a period corresponding to the length of the section. The acoustic amplitude data generated by the process of step S31 is time-series data of the amplitude of the phase difference signal for the section from the start point y to the end point x of each of the optical fiber microphones 13.

The vibration amplitude comparison unit 162 compares each of the amplitude time averages $C_q$ (t) with a predetermined vibration amplitude threshold (step S33). The vibration amplitude threshold is a value that can identify a contact vibration with respect to the normal time-series data. The vibration amplitude threshold is defined to be larger than the threshold that the section amplitude comparison unit 142 compares to the amplitude time average $A_s$ (t). When the vibration amplitude comparison unit 162 determines in the process of step S33 that all amplitude time averages $C_q$ (t) are less than or equal to the vibration amplitude threshold, it is determined that no suspicious person or object has intruded the facility. In that case, the process is terminated. For example, the next time a pulsed light is emitted from the light source 121 into the optical fiber 11, the processes from step S31 onward are executed again.

When the vibration amplitude comparison unit 162 determines that there is a portion of the vibration amplitude that exceeds the vibration amplitude threshold in one or more amplitude time averages $C_q$ (t), the vibration amplitude calculation unit 161 executes the process of step S34.

In step S34, the light source 121 emits a laser light into the optical fiber 11. A backscattered light due to Rayleigh scattering in the optical fiber 11 is received by the light receiving unit 122. Acoustic data is stored in the storage unit 128 through the photoelectric converter 123, the A-D converter 124, and a third signal data collection unit (not shown in the drawings). When the detection mode signal data collection unit 126 is positioned as the first signal data collection unit, and the direction estimation mode signal data collection unit 127 is positioned as the second signal data collection unit, the third signal data collection unit is a different signal data collection unit from the first signal data collection and the second signal data collection unit. Next, the process of step S35 is executed by the vibration amplitude comparison unit 162.

When the vibration amplitude comparison unit 162 executes the process of step S35, the section to be evaluated is shortened. For example, when i resonant medium 15 (i: an integer of 2 or more) are provided, the number of sections is set to (i/2) when the processes of steps S31 and S32 are executed, and the number of sections is set to i when the process of step S35 is executed. When the number of sections is (i/2), one section (section to be evaluated) is set across the two resonant medium 15. Specifically, the determination unit 129 provides information indicating the shortening of the section to the phase difference signal extractor 125. The phase difference signal extractor 125 extracts the phase difference information of the shortened section (short section) and makes it into a phase difference signal (acoustic data).

When each section is shortened, the length of each section should be as small as possible. As an example, the length of each section is set to the smallest value that is not less than the pulse width of the light emitted into the optical fiber 11.

The vibration amplitude calculation unit 161 generates acoustic amplitude data for each section from the acoustic data stored in the storage unit 128 (step S35). The vibration amplitude calculation unit 161 also calculates the amplitude time average $C_r$ (t) from the acoustic amplitude data (step S36). r is from 1 to m (m>n). m corresponds to i in the above example. n corresponds to (i/2) in the above example. The method of calculating the amplitude time average $C_r$ (t) is the same as the method of calculating the amplitude time average A (t) by the amplitude calculation unit 131 in the first example embodiment (refer to equation (1)). However, here, T in equation (1) is a period corresponding to the length of the section.

The vibration section identification unit 163 identifies the section corresponding to the largest amplitude time average $C_r$ (t) among multiple amplitude time averages $C_r$ (t) as the section where a vibration occurred, i.e., the section where a suspicious person or a suspicious object intruded (step S37).

In addition to the effect of the first example embodiment, this example embodiment has the effect of being able to estimate the location of an intrusion of a suspicious person or a suspicious object into a facility or the like where an optical fiber sensor is installed.

In this example embodiment, when the processes of step S1, step S21 and step S22 are executed, the way of setting the section is the same as the way of setting the section in the detection mode, but it may be the same as the way of setting the section in the direction estimation mode.

In this example embodiment, although the vibration amplitude calculation unit 161, the vibration amplitude comparison unit 162, and the vibration section identification unit 163 are added to the determination unit 129 in the first example embodiment, the vibration amplitude calculation unit 161, the vibration amplitude comparison unit 162, and the vibration section identification unit 163 may be added to the determination unit 129 in the second example embodiment. In other words, a function for estimating the location of an intrusion of a suspicious person or a suspicious object may be added to the optical fiber sensor of the second example embodiment.

Figure 6:
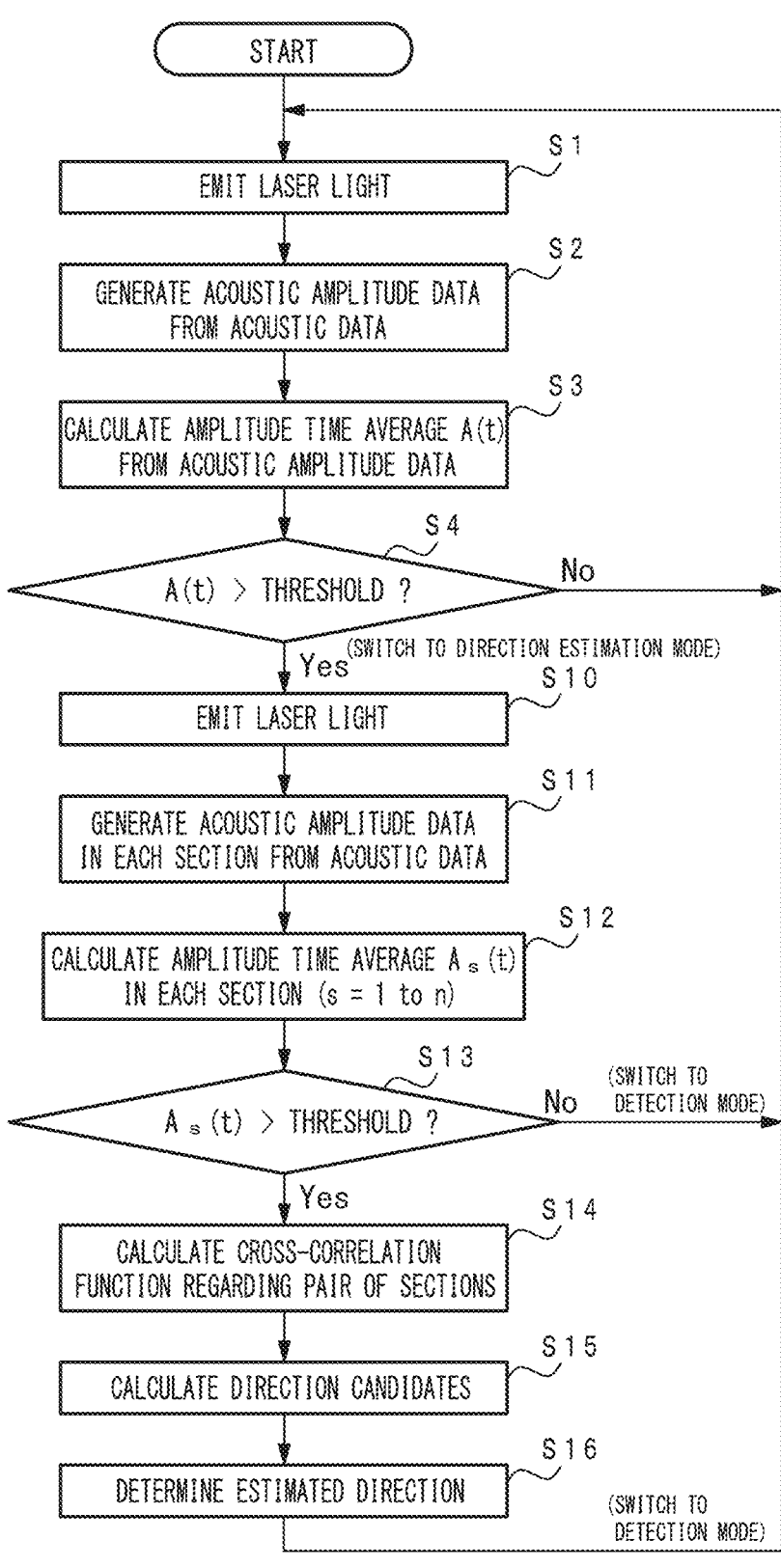
FIG. 6 It depicts a flowchart showing an operation of the optical fiber sensor of first example embodiment.

Although the optical fiber sensor of this embodiment is configured so that the process shown in FIG. 6 in the first example embodiment is executed in parallel with the process shown in FIG. 11, the optical fiber sensor may be configured so that the process shown in FIG. 11 and the process shown in FIG. 6 are executed at different times.

Although the optical fiber sensor of this example embodiment estimated an intrusion location of a suspicious person or a suspicious object based on the amplitude obtained from the vibration data (acoustic data stored in the storage 128), the optical fiber sensor may also estimate an intrusion location of a suspicious person or a suspicious object based on the feature obtained from the vibration data (duration of a vibration that deviates from the amplitude of normal time-series data or a frequency derived from the vibration data).

In each of the above example embodiments, the use of an optical fiber 11 including one fiber (core+cladding) or the use of one fiber in an optical fiber including multiple fibers is assumed. However, the optical fiber sensor of each of the above example embodiments may also use multiple fibers in an optical fiber including multiple fibers. For example, when an optical fiber including multiple fibers is used, the optical fiber sensor may also use any one fiber in the detection mode and use another one fiber in the direction estimation mode.

The optical fiber sensor of each of the above example embodiments, which use properly the detection mode and the direction estimation mode, is an optical fiber sensor based on OTDR (Optical Time Domain Reflectometer) that use a backscattered light due to Rayleigh scattering. However, it is also possible to apply each of the above example embodiments to an optical fiber sensor based on OFDR (Optical Frequency Domain Reflectometry) that uses a backscattered light.

Each of the above example embodiments may be applied to an optical fiber sensor based on R-OTDR that uses a backscattered light by Raman scattering to detect temperature, for example. In addition, each of the above example embodiments may be applied to an optical fiber sensor based on P-OTDR that detects a vibration, etc. using a change in state of polarization (SoP) of a backscattered light.

In other words, the concept of each of the above example embodiments can be effectively applied to methods that can achieve high detection performance by using properly the case where the sensor sensitivity is prioritized over the spatial resolution and the case where the spatial resolution is prioritized over the sensor sensitivity properly (in each of the above embodiments, the first section and a plurality of second sections are used properly).

Each of the above embodiments can be configured in hardware, but can also be realized by a computer program.

Figure 12:
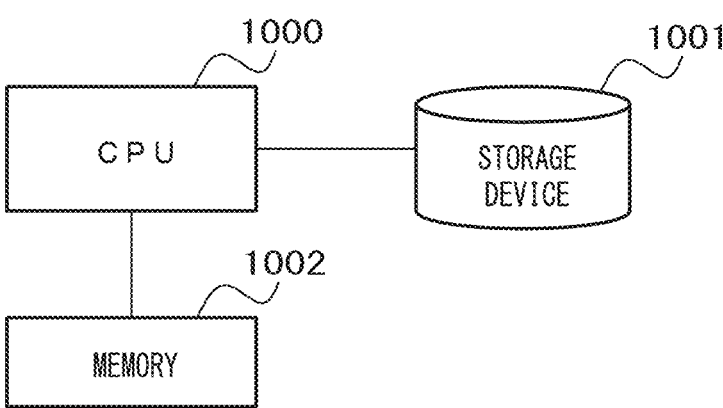
FIG. 12 It depicts a block diagram showing a computer with a CPU.

FIG. 12 is a block diagram showing an example of a computer having a CPU (Central Processing Unit).

The computer is implemented in the detector 12 in the optical fiber sensor of each of the above example embodiments. The CPU 1000 executes processing in accordance with a program (software component: codes) stored in a storage device 1001 to realize the functions in the above example embodiments. That is, the computer realizes the functions of the detection mode signal data collection unit 126, the direction estimation mode signal data collection unit 127, and the determination unit 129 in the first to third example embodiments are realized. A GPU (Graphics Processing Unit) or a combination of a CPU and a GPU can be used instead of the CPU 1000.

The storage device 1001 is, for example, a non-transitory computer readable media. The non-transitory computer readable medium is one of various types of tangible storage media. Specific examples of the non-transitory computer readable media include a magnetic storage medium (for example, hard disk), a magneto-optical storage medium (for example, magneto-optical disk), a CD-ROM (Compact Disc-Read Only Memory), a CD-R (Compact Disc-Recordable), a CD-R/W (Compact Disc-ReWritable), and a semiconductor memory (for example, a mask ROM, a PROM (programmable ROM), an EPROM (Erasable PROM), a flash ROM). When a rewritable data storage medium is used as the storage device 1001, the storage device 1001 can be used as the storage unit 128.

The program may be stored in various types of transitory computer readable media. The transitory computer readable medium is supplied with the program through, for example, a wired or wireless communication channel, i.e., through electric signals, optical signals, or electromagnetic waves.

A memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002.

Figure 13:
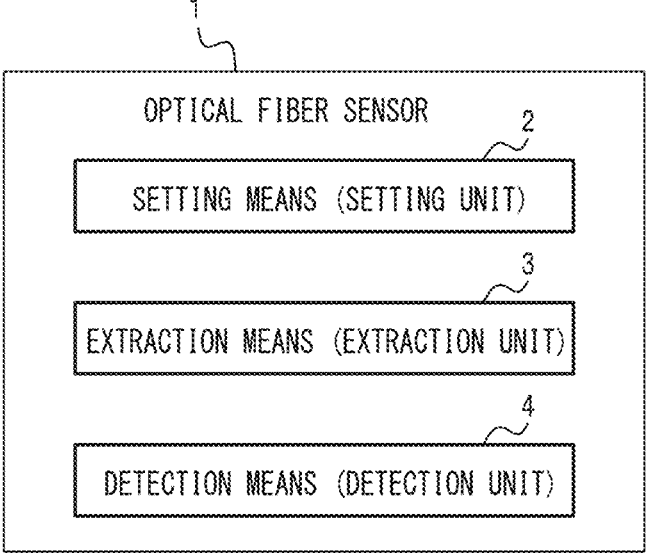
FIG. 13 It depicts a block diagram showing the main part of the optical fiber sensor.

FIG. 13 is a block diagram showing the main part of the optical fiber sensor. The optical fiber sensor 1 shown in FIG. 13 comprising setting means (a setting unit) 2 (in the example embodiments, realized by the phase difference signal extractor 125 and the determination unit 129. Especially, for example, it is realized by the phase difference signal extractor 125 extracting the phase difference signal of the section to be evaluated according to the information from the determination unit 129) for setting a section to be evaluated set in the optical fiber to one of a first section and a plurality of second sections, each of which is shorter than the first section, extraction means (an extraction unit) 3 (in the example embodiment, realized by the phase difference signal extractor 125) for extracting a state change of light (for example, a phase difference in a backscattered light) from the optical fiber, and detection means (a detection unit) 4 (in the first example embodiment, realized by the section amplitude comparison unit 142 and the sound source direction estimation unit 145. In the second example embodiment, realized by the section feature determination unit 242 and the sound source direction estimation unit 145.) for detecting a change in the surrounding environment based on time-series data of the state change of light in the section to be evaluated.

The setting means 2 may be configured to switch the section to be evaluated between the first section and the second section when the setting means determines that a time average of amplitude of time-series data of the phase difference in the section to be evaluated exceeds a predetermined value.

The optical fiber sensor 1 may comprise feature determination means (a feature determination unit: in the example embodiments, realized by the feature extraction unit 231 and the feature determination unit 232) for determining a feature of a signal based on the signal including information on the phase difference, and the setting means 2 may be configured to switch the section to be evaluated between the first section and the second section when the feature is determined to match a predetermined acoustic feature of the suspicious object.

The optical fiber sensor 1 may comprise second setting means (a second setting unit: in the third example embodiment, realized by the phase difference signal extractor 125 and the determination unit 129. Especially, for example, it is realized by the phase difference signal extractor 125 extracting the phase difference signal of the section to be evaluated according to the information from the determination unit 129) for setting the section to be evaluated into a plurality of short sections, each of which is shorter than the second section, and identifying means (an identifying unit: in the third example embodiment, it is realized by the vibration section identification unit 163) for identifying the short section presenting a maximum value of the time average of amplitude of the time-series data of the phase difference in each of the plurality of short sections.

A part of or all of the above example embodiments may also be described as, but not limited to, the following supplementary notes.

(Supplementary note 1) An optical fiber sensor that detects a change in a surrounding environment of an optical fiber, the optical fiber sensor comprising:

setting means for setting a section to be evaluated set in the optical fiber to one of a first section and a plurality of second sections, each of which is shorter than the first section;

extraction means for extracting a state change of light from the optical fiber, and detection means for detecting a change in the surrounding environment based on time-series data of the state change of light in the section to be evaluated.

(Supplementary note 2) The optical fiber sensor according to Supplementary note 1, wherein the state change of light is a phase difference in a backscattered light from the optical fiber.

(Supplementary note 3) The optical fiber sensor according to Supplementary note 2, wherein the setting means switches the section to be evaluated between the first section and the second section when the setting means determines that a time average of amplitude of time-series data of the phase difference in the section to be evaluated exceeds a predetermined value.

(Supplementary note 4) The optical fiber sensor according to Supplementary note 2 or 3, further comprising feature determination means for determining a feature of a signal based on the signal including information on the phase difference, wherein the setting means switches the section to be evaluated between the first section and the second sections when the feature determination means determines that the determined feature matches a predetermined acoustic feature.

(Supplementary note 5) The optical fiber sensor according to any one of Supplementary notes 2 to 4, further comprising:

second setting means for setting the section to be evaluated to a plurality of short sections, each of which is shorter than the second section, and identification means for identifying the short section presenting a maximum value of the time average of amplitude of the time-series data of the phase difference in each of the plurality of short sections.

(Supplementary note 6) The optical fiber sensor according to any one of Supplementary notes 1 to 5, wherein the setting means sets the second section to a length shorter than a half the length of the first section.

(Supplementary note 7) The optical fiber sensor according to any one of Supplementary notes 1 to 6, wherein one optical fiber microphone is formed by an entire length or a part of the optical fiber wound around a cylindrical resonant medium that resonates to an acoustic signal.

(Supplementary note 8) A change detection method for detecting a change in a surrounding environment of an optical fiber, the change detection method comprising:

setting a section to be evaluated set in the optical fiber to one of a first section and a plurality of second sections, each of which is shorter than the first section;

extracting a state change of light from the optical fiber, and detecting a change in the surrounding environment based on time-series data of the state change of light in the section to be evaluated.

(Supplementary note 9) The change detection method according to Supplementary note 8, wherein the state change of light is a phase difference in a backscattered light from the optical fiber.

(Supplementary note 10) The change detection method according to Supplementary note 9, wherein the section to be evaluated is switched between the first section and the second section when determining that a time average of amplitude of time-series data of the phase difference in the section to be evaluated exceeds a predetermined value.

(Supplementary note 11) The change detection method according to Supplementary note 9 or 10, further comprising:

determining a feature of a signal based on the signal including information on the phase difference, and switching the section to be evaluated between the first section and the second sections when determining that the determined feature matches a predetermined acoustic feature.

(Supplementary note 12) The change detection method according to any one of Supplementary notes 8 to 11, further comprising:

setting the section to be evaluated into a plurality of short sections, each of which is shorter than the second section, and identifying the short section presenting a maximum value of the time average of amplitude of the time-series data of the phase difference in each of the plurality of short sections.

(Supplementary note 13) A computer readable recording medium storing a change detection program, wherein the change detection program causes a computer to execute:

a process of setting a section to be evaluated set in the optical fiber to one of a first section and a plurality of second sections, each of which is shorter than the first section;

a process of extracting a state change of light from the optical fiber, and a process of detecting a change in the surrounding environment based on time-series data of the state change of light in the section to be evaluated.

(Supplementary note 14) The computer readable recording medium according to Supplementary note 13, wherein the state change of light is a phase difference in a backscattered light from the optical fiber.

(Supplementary note 15) A change detection program causing a computer to execute:

a process of setting a section to be evaluated set in the optical fiber to one of a first section and a plurality of second sections, each of which is shorter than the first section;

a process of extracting a state change of light from the optical fiber, and a process of detecting a change in the surrounding environment based on time-series data of the state change of light in the section to be evaluated.

(Supplementary note 16) The change detection program according to Supplementary note 15, wherein the state change of light is a phase difference in a backscattered light from the optical fiber.

Although the invention of the present application has been described above with reference to example embodiments, the present invention is not limited to the above example embodiments. Various changes can be made to the configuration and details of the present invention that can be understood by those skilled in the art within the scope of the present invention.

REFERENCE SIGNS LIST

1 Optical fiber sensor
2 Setting means
3 Extraction means
4 Detection means
10 Sound Source
11 Optical fiber

22

12 Detector
13 Optical fiber microphone
14 Optical fiber microphone array
15 Resonant medium
121 Light source
122 Light receiving unit
123 Photoelectric converter
124 A-D converter
125 Phase difference signal extractor
126 Detection mode signal data collection unit
127 Direction estimation mode signal data collection unit
128 Storage unit
129 Determination unit
131 Amplitude calculation unit
132 Amplitude comparison unit
141 Section amplitude calculation unit
142 Section amplitude comparison unit
145 Sound source direction estimation unit
151 Cross-correlation calculation unit
152 Sound source direction calculation unit
153 Sound source direction determination unit
161 Vibration amplitude calculation unit
162 Vibration amplitude comparison unit
163 Vibration section identification unit
231 Feature extraction unit
232 Feature determination unit
241 Section feature extraction unit
242 Section feature determination unit
1000 CPU
1001 Storage device
1002 Memory

What is claimed is:

1. An optical fiber sensor that detects a change in a surrounding environment of an optical fiber, comprising:
a memory storing software instructions, and
one or more processors configured to execute the software instructions to
set a section to be evaluated set in the optical fiber to one of a first section and a plurality of second sections, each of which is shorter than the first section;
extract a phase difference in a backscattered light from the optical fiber, and
detect a change in the surrounding environment based on time-series data of the phase difference in the section to be evaluated,
wherein the one or more processors are configured to execute the software instructions to switch the section to be evaluated between the first section and the second section when determining a time average of amplitude of time-series data of the phase difference in the section to be evaluated exceeds a predetermined value.

2. The optical fiber sensor according to claim 1, wherein the one or more processors are configured to further execute the software instructions to
determine a feature of a signal based on the signal including information on the phase difference, and
switch the section to be evaluated between the first section and the second sections in response to a determination that the determined feature matches a predetermined acoustic feature.

3. The optical fiber sensor according to claim 1, the one or more processors are configured to further execute the software instructions to
set the section to be evaluated to a plurality of short sections, each of which is shorter than the second section, and identify the short section presenting a maximum value of a time average of amplitude of the time-series data of the phase difference in each of the plurality of short sections.

4. The optical fiber sensor according to claim 1, wherein the one or more processors are configured to execute the software instructions to set the second section to a length shorter than a half the length of the first section.

5. The optical fiber sensor according to claim 1, wherein one optical fiber microphone is formed by an entire length or a part of the optical fiber wound around a cylindrical resonant medium that resonates to an acoustic signal.

6. A change detection method for detecting a change in a surrounding environment of an optical fiber, comprising:

setting a section to be evaluated set in the optical fiber to one of a first section and a plurality of second sections, each of which is shorter than the first section;

extracting a phase difference in a backscattered light from the optical fiber, and detecting a change in the surrounding environment based on time-series data of the phase difference in the section to be evaluated, wherein the section to be evaluated is switched between the first section and the second section when determining that a time average of amplitude of time-series data of the phase difference in the section to be evaluated exceeds a predetermined value.

7. The change detection method according to claim 6, further comprising:

determining a feature of a signal based on the signal including information on the phase difference, and switching the section to be evaluated between the first section and the second sections when determining that the determined feature matches a predetermined acoustic feature.

8. The change detection method according to claim 6, further comprising:

setting the section to be evaluated into a plurality of short sections, each of which is shorter than the second section, and identifying the short section presenting a maximum value of a time average of amplitude of the time-series data of the phase difference in each of the plurality of short sections.

9. A non-transitory computer readable recording medium storing a change detection program, wherein the change detection program causes a computer to execute:

setting a section to be evaluated set in the optical fiber to one of a first section and a plurality of second sections, each of which is shorter than the first section;

extracting a phase difference in a backscattered light from the optical fiber, and detecting a change in the surrounding environment based on time-series data of the phase difference in the section to be evaluated, wherein the section to be evaluated is switched between the first section and the second section when determining that a time average of amplitude of time-series data of the phase difference in the section to be evaluated exceeds a predetermined value.

* * * * *